US010216929B2

(12) United States Patent
Driessen et al.

(10) Patent No.: US 10,216,929 B2
(45) Date of Patent: Feb. 26, 2019

(54) CHIP AND METHOD FOR DETECTING A CHANGE OF A STORED DATA VECTOR

(71) Applicant: Infineon Technologies AG, Neubiberg (DE)

(72) Inventors: Benedikt Driessen, Munich (DE); Steffen Sonnekalb, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 70 days.

(21) Appl. No.: 15/084,533

(22) Filed: Mar. 30, 2016

(65) Prior Publication Data

US 2016/0294414 A1 Oct. 6, 2016

(30) Foreign Application Priority Data

Mar. 30, 2015 (DE) .......................... 10 2015 104 841

(51) Int. Cl.
| | |
|---|---|
| G06F 11/00 | (2006.01) |
| G06F 11/08 | (2006.01) |
| G06F 11/10 | (2006.01) |
| G06F 21/55 | (2013.01) |
| G06F 21/72 | (2013.01) |
| G06F 3/06 | (2006.01) |

(52) U.S. Cl.
CPC .............. *G06F 21/55* (2013.01); *G06F 11/00* (2013.01); *G06F 11/08* (2013.01); *G06F 11/1012* (2013.01); *G06F 11/1048* (2013.01); *G06F 21/72* (2013.01); *G06F 3/0619* (2013.01)

(58) Field of Classification Search
CPC ............ G06F 11/1012; G06F 11/1048; G06F 11/1076; G06F 11/08; G06F 21/55; G06F 21/72; H03M 13/19; H03M 13/152; G11C 29/42
USPC ........................................................ 714/819
See application file for complete search history.

(56) References Cited

U.S. PATENT DOCUMENTS

| | | | | |
|---|---|---|---|---|
| 8,301,963 | B2 * | 10/2012 | Hou .................... | G06F 11/1068 714/755 |
| 9,048,876 | B2 * | 6/2015 | Frayer ................. | G06F 11/1012 714/763 |
| 9,105,358 | B2 * | 8/2015 | Tarui ................... | G06F 11/1012 |
| 9,311,181 | B2 * | 4/2016 | Lee ...................... | G06F 11/1048 |
| 9,385,754 | B2 * | 7/2016 | Sakai .................. | H03M 13/1117 |
| 9,547,551 | B2 * | 1/2017 | Tarui ................... | G06F 11/1012 |
| 2010/0077281 | A1 * | 3/2010 | Bae ....................... | G06F 11/073 714/758 |

(Continued)

*Primary Examiner* — James C Kerveros
(74) *Attorney, Agent, or Firm* — Viering, Jentschura & Partner mbB (57) ABSTRACT

A chip is provided having processing circuits, each processing circuit configured to process a data vector to be stored according to a multiplication of the vector by a processing matrix, the sum of the processing matrices corresponding to the non-unit-matrix part of a generator matrix of a predetermined linear code in reduced form, a summing circuit to sum the results of the processing operations of the data vector, a storage circuit to store the data vector to be stored together with the sum of the generated results as one data word in a memory, a read-out circuit to read the stored data word out of the memory, and a decoding circuit to check whether the data word read out is a valid code word of the linear code and to output an error signal if the data word is not a valid code word of the linear code.

19 Claims, 4 Drawing Sheets

(56) References Cited

U.S. PATENT DOCUMENTS

| | | | |
|---|---|---|---|
| 2011/0258522 A1* | 10/2011 | Sakomizu | H03M 13/1194 714/790 |
| 2012/0137190 A1* | 5/2012 | Panteleev | H03M 13/235 714/752 |
| 2013/0145229 A1* | 6/2013 | Frayer | G06F 11/1012 714/755 |
| 2013/0332797 A1 | 12/2013 | Chung | |
| 2014/0281828 A1* | 9/2014 | Micheloni | G06F 11/00 714/773 |
| 2015/0212877 A1* | 7/2015 | Kern | G11C 7/1006 714/764 |
| 2015/0293716 A1* | 10/2015 | Jiang | H03M 13/13 711/154 |
| 2015/0363263 A1* | 12/2015 | Hassner | H03M 13/1134 714/757 |

* cited by examiner

CHIP AND METHOD FOR DETECTING A CHANGE OF A STORED DATA VECTOR

CROSS-REFERENCE TO RELATED APPLICATION

This application claims priority to German Patent Application Serial No. 10 2015 104 841.8, which was filed Mar. 30, 2015, and is incorporated herein by reference in its entirety.

TECHNICAL FIELD

Various embodiments relate generally to chips and methods for detecting a change of a stored data vector.

BACKGROUND

Safety-related data processing systems such as a microprocessor or a microcontroller which, for example, are provided on a chip card, are typically protected against attacks. In particular, manipulations of generated data and of commands (and thus of a program execution), for example, are to be avoided. In order to avoid excessive added costs with regard to chip area requirement and energy consumption, efficient approaches are desirable which provide for a protection against such attacks.

SUMMARY

A chip is provided having processing circuits, each processing circuit configured to process a data vector to be stored according to a multiplication of the vector by a processing matrix, the sum of the processing matrices corresponding to the non-identity-matrix part of a generator matrix of a predetermined linear code in reduced form, a summing circuit to sum the results of the processing operations of the data vector, a storage circuit to store the data vector to be stored together with the sum of the generated results as one data word in a memory, a read-out circuit to read the stored data word out of the memory, and a decoding circuit to check whether the data word read out is a valid code word of the linear code and to output an error signal if the data word is not a valid code word of the linear code.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The word "exemplary" is used herein to mean "serving as an example, instance, or illustration". Any embodiment or design described herein as "exemplary" is not necessarily to be construed as preferred or advantageous over other embodiments or designs.

The detailed description following relates to the attached figures which show details and embodiments. These embodiments are described in such detail that the expert can carry out the invention. Other embodiments are also possible and the embodiments can be changed in structural, logical and electrical terms without deviating from the subject matter of the invention. The various embodiments are not necessarily mutually exclusive but various embodiments can be combined with one another so that new embodiments are produced. Within the context of the present description, the terms "connected" "attached" and "coupled" are used for describing both a direct and an indirect connection, a direct or indirect attachment and a direct or indirect coupling.

Figure 1:
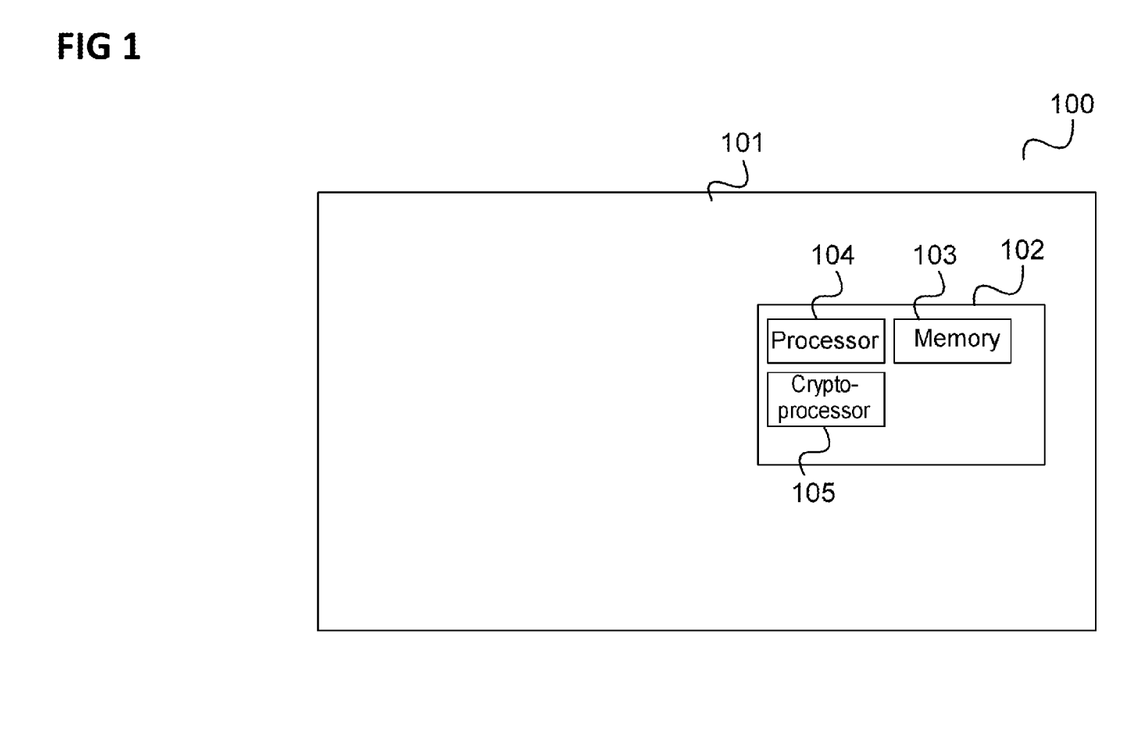
FIG. 1 shows a chip card.

FIG. 1 shows a chip card 100.

The chip card 100 has a carrier 101 on which a chip card module 102 is arranged. The chip card module 102 is, for example, a chip which has various data processing components such as, for example, a memory 103, a processor 104 or, for example, a dedicated cryptoprocessor 105.

The chip card module 102 carries out, for example, operations which are to be secured, i.e. the operations and/or their results such as, for example, key calculations, are to be kept secret from third parties and should be protected against manipulations. In this sense, the chip card module 102 or certain components thereof such as, for example, the processor 104 or the cryptoprocessor should be secured.

For example, microcontrollers or processors are protected against selective manipulations during the execution of a program. A manipulation could take place, for example, selectively (e.g. by means of laser or needles) or unselectively (e.g. by flashlight or heat).

To protect a processor arrangement, e.g. a chip, against selective error attacks, a number of parallel ALUs (or CPUs) and a data and command path provided with an [n, k, d] error detection code can be used, for example. In this context, commands are decoded by the ALUs before the execution and results are correspondingly coded thereafter.

In the text which follows, embodiments are described which provide for an efficient implementation of such an approach for protection by redundant calculation on the basis of a special class of linear codes. In various embodiments, a requirement of low current and area can be achieved so that complete integration of data/command path and ALUs is provided for.

Figure 2:
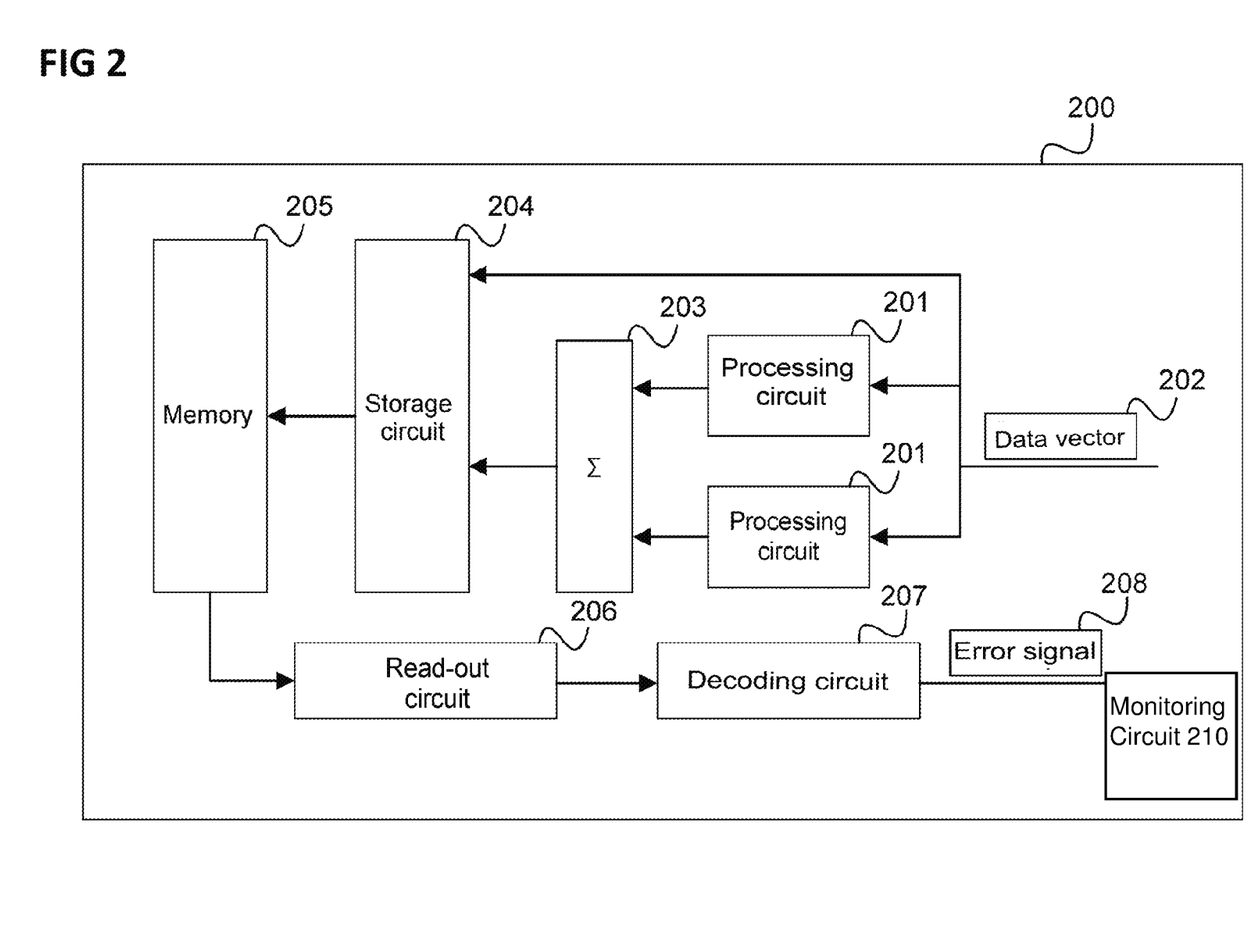
FIG. 2 shows a chip according to one embodiment.

FIG. 2 shows a chip 200 according to one embodiment.

The chip 200 has a plurality of processing circuits 201, each processing circuit 201 being configured to process a data vector 202 to be stored in accordance with a multiplication of the data vector 202 to be stored by a (respective) processing matrix, the sum of the processing matrices corresponding to the non-identity-matrix part of a generator matrix of a predetermined linear code in reduced form.

The chip 200 also has a summing circuit 203 which is configured to sum the results, generated by the processing circuits 201, of the processing operations of the data vector (i.e. the versions of the data vector as generated by the processing operations).

Furthermore, the chip 200 has a storage circuit 204 which is configured to store the data vector 202, to be stored, together with the sum of the generated results of the processing operations as one data word in a memory 205. The memory 205 can be part of the chip 200 or also an external memory which, for example, is provided on a chip card together with the chip.

The chip 200 also has a read-out circuit 206 configured to read the stored data word out of the memory 205 and has a decoding circuit 207 configured to check whether the data word read out is a valid code word of the linear code and to output an error signal 208 (for example a further component of the chip, e.g. a monitoring component) if the data word is not a valid code word of the linear code.

In other words, the redundant part of a linear code is calculated by means of a sum of linear transformations of the data vector, for example permutations of the data vector. The redundant part is deposited, together with the data vector to be stored, as data word (i.e. coded data vector) in a memory, i.e. in a plurality of memory cells, and these memory cells are read out and the data word read out (possibly changed compared with the stored data word) is checked to establish whether it has been manipulated. Depending on the Hamming distance of the linear code, attacks which result in a particular maximum number of bit errors (i.e. of differences between the stored data word and the data word read out) can be detected during this process. If it is detected that the stored data word and data word read out differ, an error signal is output and, for example, an attack is presumed. Appropriate precautions can then be taken (e.g. by a monitoring circuit which receives the error signal), for example components of the chip can be deactivated or the execution of a program can be recommenced.

In the case of the notation of a coding of a vector w to form a code word c by means of a generator matrix G as c=w*G, G being in standard form, the processing operations of the data vector to be stored correspond, for example, to left-multiplications of the data vector by matrices, the sum of which is equal to the non-identity-matrix part of the generator matrix.

For an efficient implementation, for example by being based on a multiple-ALU chip architecture, a particular class of linear codes can be used as is described, for example, below.

The components of the chip can be implemented by one or more circuits. In one embodiment, a circuit can be understood to be any unit which implements a logic and which can be both hardware, software, firmware or a combination thereof. Thus, a circuit can be a hard-wired logic circuit in one embodiment, or a programmable logic circuit such as, for example, a programmable processor, e.g. a microprocessor. A circuit can also be understood to be a processor which executes software.

According to one embodiment, the chip has a plurality of ALUs, each ALU being configured to generate the data vector from an input vector.

Each processing circuit is connected, for example, to the output of a respective ALU and the ALU is configured to supply the data vector to the processing circuit.

The memory is connected, for example, to the output of one of the ALUs (for example one of the ALUs which does not supply the data vector generated by it to a processing circuit) configured to supply the data vector to the memory.

According to one embodiment, the data vector represents a command for a processing element of the chip (for example, the data vector is a binary representation of a program instruction).

The processing element is, for example, an ALU of the chip (or also a processor of the chip which contains one or more ALUs).

Each processing matrix has, for example, a one per row and otherwise zeros and one or more ones per row and otherwise zeros. In other words, each processing matrix is a matrix which generates by (left) multiplication a new (possibly shorter) vector from the vector to be stored in which it selects for each component of the new vector one (or more) components of the vector to be stored, each component being selected exactly once.

The processing matrices are, for example, permutation matrices (i.e. each row and each column contains exactly one one and otherwise zeros) and each processing circuit is, for example, a permutation circuit and is configured to permutate the data vector to be stored in accordance with one of the permutation matrices.

The processing matrices are, for example, at least partially different (i.e. the processing circuits perform different processing operations at least partially).

According to one embodiment, the non-identity-matrix part is a vector of matrices which can be represented in each case as a sum of processing matrices.

Each matrix of the matrices is based, for example, on a circular matrix (is, for example, a circular matrix).

According to one embodiment, the matrices are matrices determined on the basis of at least one predetermined characteristic of the linear code. For example, the matrices are looked for in a search space so that the at least one predetermined characteristic is met.

The at least one predetermined characteristic is, for example, the Hamming distance of the linear code.

According to one embodiment, the decoding circuit is configured to determine for a part of the data word read out which corresponds to the data vector, a redundancy part according to the summing of processing operations according to multiplications by the processing matrices and to check whether the redundant part corresponds to the sum generated by the summing circuit.

According to one embodiment, a chip card comprising a chip described above is provided.

Figure 3:
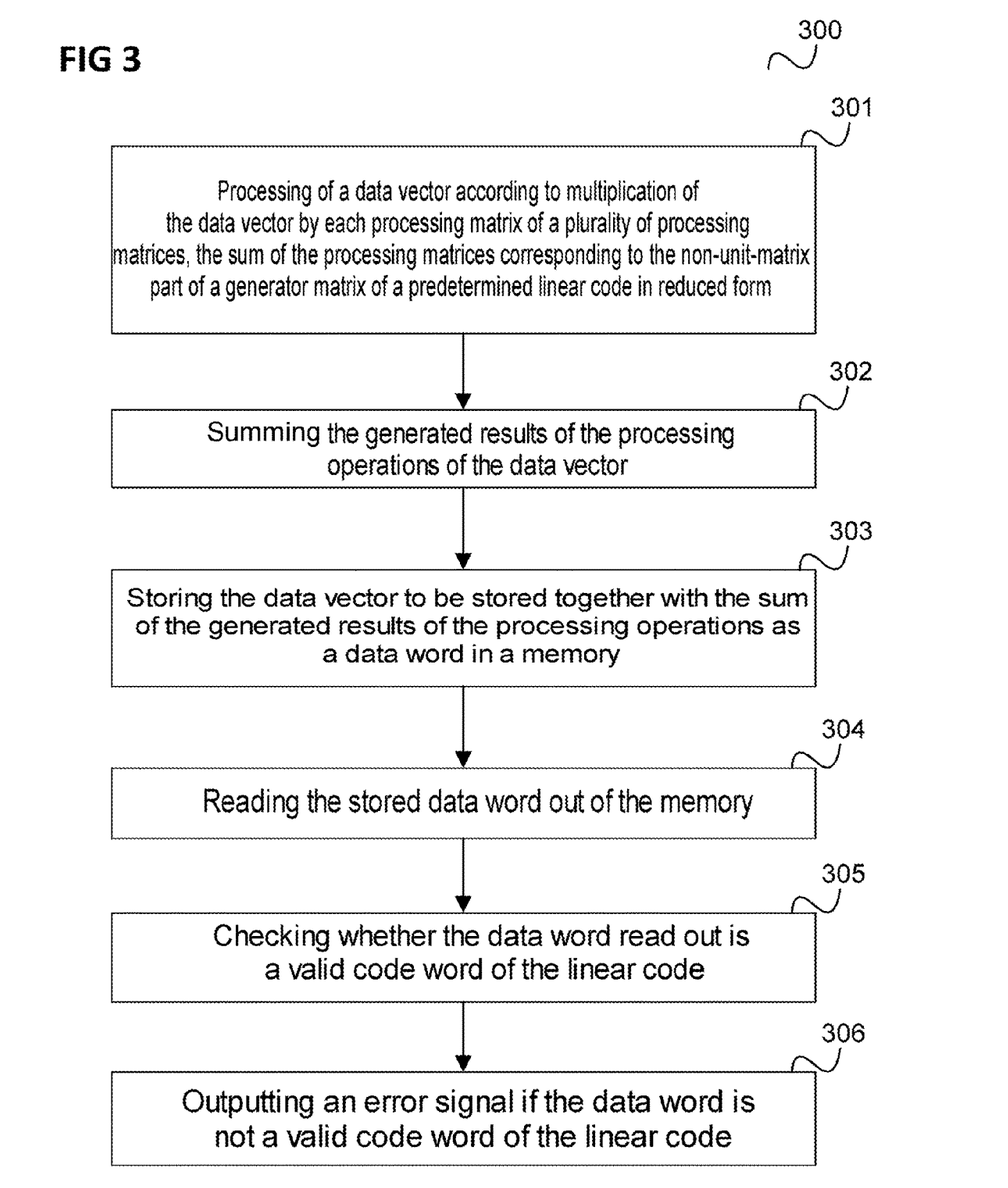
FIG. 3 shows a flowchart according to one embodiment.

The chip performs, for example, a method as is shown in FIG. 3.

FIG. 3 shows a flowchart 300.

The flowchart 300 illustrates a method for detecting a change (e.g. a manipulation) of a stored data vector.

In 302, a data vector is processed according to a multiplication by each processing matrix of a plurality of processing matrices, the sum of the processing matrices corresponding to the non-identity-matrix part of a generator matrix of a predetermined linear code in reduced form.

In 303, the generated results of the processing operations of the data vector are summed.

In 304, the data vector to be stored together with the sum of the generated results of the processing operations is stored as a data word in a memory.

In 305, the stored data word is read out of the memory (for example after a certain storage time).

In 306, it is checked whether the data word read out is a valid code word of the linear code.

In 306, an error signal is output if the data word is not a valid code word of the linear code.

It should be noted that exemplary embodiments which are described in conjunction with the chip 200 apply analogously to the method shown in FIG. 3, and conversely.

In the text which follows, embodiments will be described more accurately.

For the coding of data to be stored, e.g. of a data vector to be stored so that it is protected against manipulation or a manipulation can be detected, the data vector is coded by means of a linear [n, k, d] code according to one embodiment.

In the case of a linear [n, k, d] code, an n-bit code word c is formed by the multiplication of a k-bit data vector w by a generator matrix G:

$$c=w*G.$$

According to one embodiment, energy- and area-efficient coding of a linear code is achieved on the basis of a special generator matrix:

If the generator matrix is in a systematic form (also called reduced form or standard form), G=[I|E] applies. In this context, I is a k×k. identity matrix (or unit matrix) and the matrix E is designated as non-identity-matrix part of the matrix G. In the following embodiment, the coding is implemented in an efficient manner by utilizing the characteristic of the code that E can be represented as a sum of h permutation matrices, i.e.

$$E = P_1 + P_2 + \ldots + P_h,$$

i.e. if the sum of the permutation matrices corresponds to the non-identity-matrix part of the generator G in reduced form, a code word can be formed as follows:

$$c = w * G = [w | w * P_1 + w * P_2 + \ldots + w * P_h].$$

Coding of a data vector can be achieved therefore in that the data vector is in each case permutated in accordance with the permutation matrices $P_1$ to $P_h$, the results are added and the data vector, together with the result of the addition (i.e. data vector and result of the addition written behind one another, i.e. appended to each other) is used as coded data word, e.g. is stored. In other words, the code word is formed as c=[w|r], where w is the data vector to be protected and $r = \sum_i^h w * P_i$ is a redundant part. If h=d applies, it is possible to detect, for example when the code word is stored, read out later and checked, an attack with d−1 induced single errors in the code word. In other words, an attack can be detected which modifies the code word into a word ĉ if the word ĉ differs from the code word c at d−1 positions at the most.

If, for example, the data vector is the result w of a processing operation of an input vector v by each of a plurality of ALUs, the data vector can be generated in that the first ALU provides the result w and for each further ALU provides a permutated version of its output w, the permutated versions are summed and, together with the result w, are stored as coded data vector (instead of each ALU calculating its own coded data vector c=w*G). This is shown in FIG. 4.

Figure 4:
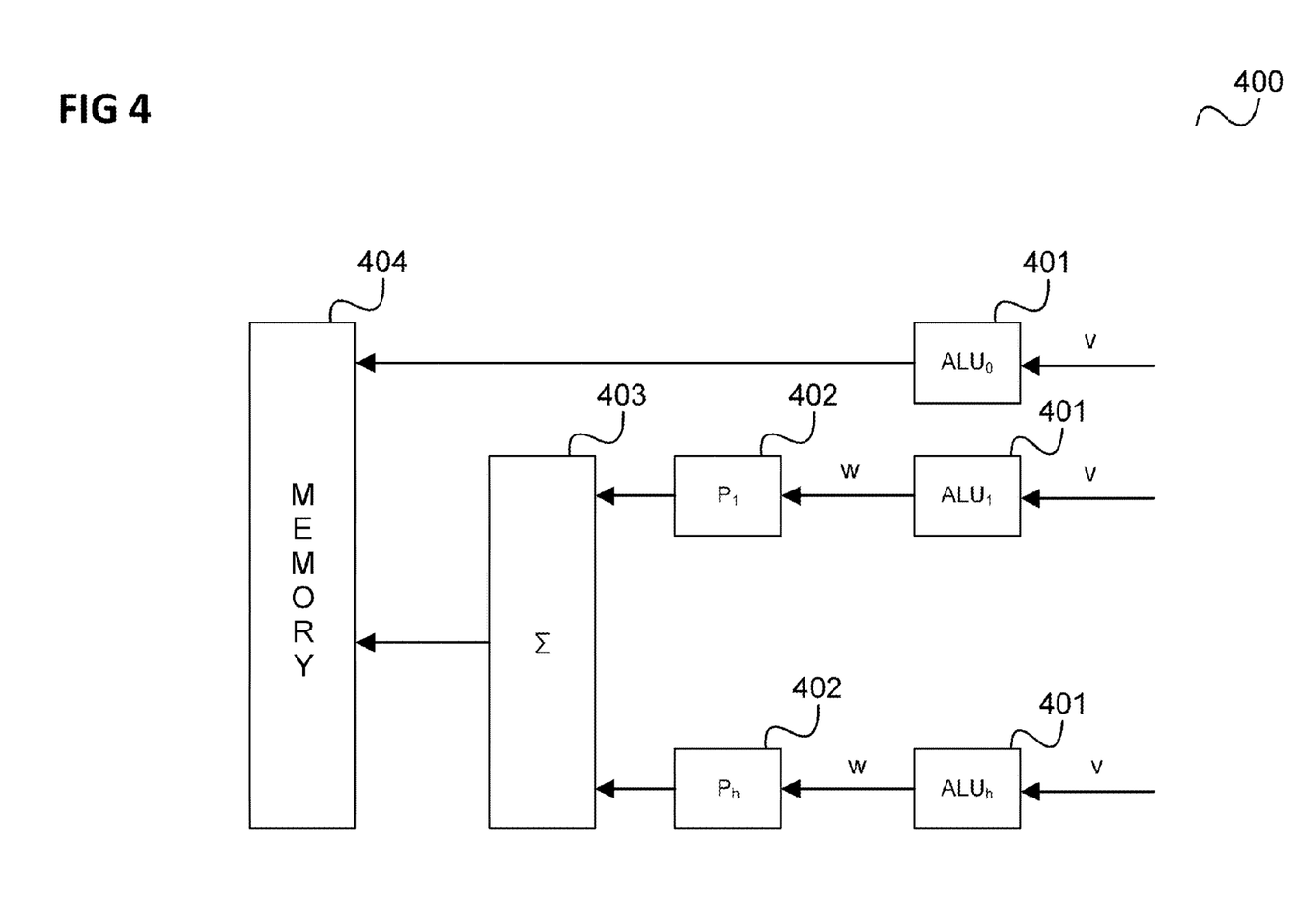
FIG. 4 shows a data processing arrangement of a chip according to one embodiment.

FIG. 4 shows a data processing arrangement 400 of a chip according to one embodiment.

In this example, the chip has h+1 parallel ALUs (arithmetic logic units) $ALU_0$ to $ALU_h$ 401 which receive in each case an input vector v and process it into a data vector w to be stored (and to be protected).

A permuting unit $P_i$ 402, which receives and permutes the data vector w from the ith ALU, is connected behind the ith ALU (for i=1, . . . , h). A summing circuit 403 sums the outputs of the permuting unit (for i=1, . . . , h) and thus generates the redundant part r. The redundant part r is appended to the data vector w and the resultant data word c=[w|r] (which is a code word of the linear code) is stored in a memory 404.

The checking of a data word stored in the memory 404, for example if the data word is to be read into the ALUs 401 for further processing, can take place by means of a similar structure from permuting circuits 402 and summing circuit 403. If the data word ĉ=[ŵ|r̂] is read out, the first k bits ŵ are supplied to each permuting circuit, the result of the results of the processing operations are summed and the result of the summation, i.e. a newly calculated redundant part r', is compared with the part r̂ corresponding to the redundant part of the data word read out (e.g. by an additionally provided comparator). If c and ĉ differ in one up to, at the most, d−1 positions, this can be detected in this manner and, for example, an error signal can be output.

The coding can also be applied to commands. For example, a command is coded analogously to the data vector w before it is stored in the memory 404. This can be performed by a circuit of the chip or the commands, e.g. of a program to be executed by the chip, can be supplied already coded to the chip. If a command is to be executed, for example, by the ALUs 401, the corresponding data word is read out of the memory and, analogously to the above check of ĉ, it is checked whether the data word is a valid code word. Manipulations of commands which, at the most, result in d−1 faulty positions, can thus be detected.

For example, the data word corresponding to a command and stored in the memory, is fanned out into h+1 versions if it is to be executed by the h+1 ALUs 401. In this case, analogously to the data vector, h versions of the command part of the data word (i.e. the first part of the data word without redundant part) can be supplied to h permuting units and a new redundant part can be calculated by permutation and summing and compared with the redundant part of the data word read out in order to determine whether the data word has been modified.

So that the coding can be implemented efficiently in the above manner, a code is used, the generator matrix of which, as described above, can be described as G=[I|E]; with $E = P_1 + P_2 + \ldots + P_h$. In the text which follows, a class of codes of codes is described which have this characteristic and it is shown how they can be found efficiently for a multiplicity of different parameters [n, k, d]. These enable the efficient coding for an error-tolerant multi-ALU system (or multi-CPU system) as described above.

For certain, small parameters (size of the generator matrix, code distance among others), a suitable code can be determined by trivial runnings of all possible matrices.

However, above a certain size or code distance, the search space to be traversed is too large and thus it is often the case that no suitable matrix can be determined efficiently any longer: for a linear code with the parameters [n,k,d] (assuming a code which meets the Singleton limit) matrices would have to be generated and tested here in the worse case $$\binom{n-k}{d-1}^k.$$

In this context, the latter means that two checks must be made:

Whether a linear code having the desired characteristics is produced.

Whether and how an analysis is possible.

Although this approach can find certain, unstructured codes, it is typically not suitable for finding a code which can be used in an actual implementation; in contrast, this typically requires a class of codes having a suitable structure.

Assuming that the generator matrix of a linear [n, k, d] code has the following form:

$$G = [U_1 \mid U_2 * E] \text{ with } E = \begin{bmatrix} V_1 * E_1 \\ V_2 * E_2 \\ \vdots \\ V_l * E_l \end{bmatrix}.$$

E has dimension k×r (with r=n–k) and $U_1$, $U_2$ are permutation matrices having the dimension k×k. So that a systematic code is generated, $U_1$ must be the unit matrix; if this is a non-trivial permutation matrix, the principle described will continue to function, however. In the text which follows, it is assumed that $U_1$ and $U_2$ are unit matrices. The essential criterion for efficiently finding G can be seen in that the matrices $E_i$ (having the dimension r×r) have a circular form:

$$E_i = circ([e_1^{(i)} e_2^{(i)} \ldots e_r^{(i)}]) = \begin{bmatrix} e_1^{(i)} e_2^{(i)} & \ldots & e_r^{(i)} \\ \vdots & \ddots & \vdots \\ e_r^{(i)} e_1^{(i)} & \ldots & e_{r-1}^{(i)} \end{bmatrix} \text{ with } e_j^{(i)} \in \{0, 1\}.$$

In this context, each of the submatrices $E_i$ is unambiguously determined by the rotation of a specific vector with r elements. The first row of $E_i$ is in each case specified directly by the vector, all other rows are specified by a left or right rotation of the preceding row (the direction of rotation not changing within the matrix). l=⌈k/r⌉ submatrices are generated from which then, by means of multiplication by means of suitable matrices $V_i$ k rows are selected in sum and combined to form E.

The analysis of the $E_i$ in permutation matrices is obtained from the generating vector:

$$E_i = circ([e_1^{(i)} \ldots e_r^{(i)}]) = circ([p_1^{(i,1)} \ldots p_r^{(i,2)}]) + \ldots + circ([p_1^{(i,h)} \ldots p_r^{(i,h)}])$$

with $$p_k^{(i,j)} = \begin{cases} e_k^{(i)} & \text{if } \sum_{m=1}^{k} e_m^{(i)} = j \\ 0 & \text{otherwise} \end{cases}.$$

Thus, the h ones of the vector are distributed individually to h different matrices which, due to the circular structure (and because they are quadratic) are then permutation matrices.

If the search space is restricted to matrices of circular form, maximally $$\binom{r}{h}$$

options still remain per $E_i$ (where h is the permissible number of ones per submatrix, for example h=d–1 applies which can be considered to be the ideal case). Even for large parameter spaces, it is therefore possible to find the suitable vectors for the submatrices without excessive demands on the available computing power, e.g. by means of a standard PC.

A data word w of length k can now be divided into i consecutive blocks w=[$w_1|w_2| \ldots |w_i$], the number of bits in $w_i$ being equal to the number of rows of the associated matrix $V_i$. The coding can thus be represented as $$w*G=w*[I|E]=[w|w_3*(V_1*E_2)+w_2*(V_2*E_2)+\ldots+w_i*(V_i*E_i)],$$

where each of the products $w_i*(V_i*E_i)$ can be calculated as the sum of permutations of $w_i$.

As an example, it is assumed that a data processing system (for example implemented by a chip) is equipped with a 16-bit data path and four parallel ALUs. In the representation of FIG. 4, thus h=3 and w would be a 16-bit vector.

It shall also be assumed that w is to be coded with 8-bit redundancy. In consequence, a systematic, linear [24, 16, 4] code is required for which two matrices $E_1,E_2$ of the dimension 8×8 must be found. Assuming that there is a code having three ones per matrix, all possible matrices $$\binom{8}{3} = 56$$

of circular structure can be run through rapidly (for example by means of a program on a computer). A possible result would be, for example:

$E_1$=circ([11100000])=$P_1+P_2+P_3$ and $E_2$=circ ([11010000])=$P_4+P_5+P_6$.

Both matrices disintegrate into in each case three permutation matrices, these being defined as follows:

$P_1$=circ([10000000]), $P_2$=circ([01000000]), $P_3$=circ ([00100000]), $P_4$=circ([10000000]), $P_5$=circ ([01000000]), $P_6$=circ([00010000]).

This results in the following calculation formula for the code word resulting from w=[$w_1|w_2$]:

$c$=[$w|w_1*P_1+w_1*P_2+w_1*P_3+w_2*P_4+w_2*P_5+w_2*P_6$].

The calculation of the redundancy can then be divided into three ALUs as described with reference to FIG. 4: the ith ALU (i=1, 2, 3) provides a vector w permuted by $$\begin{bmatrix} P_i \\ P_{i+3} \end{bmatrix}$$

and the first ALU (i=0) calculates the unmodified vector w.

Whereas in the above embodiment, an analysis of the non-identity matrix part of the generator matrix in standard form into permutation matrices is used, other analyses can be used, for example in the case that the non identity matrix part of the generator matrix is not quadratic (depending on the code to be used), for example into matrices which have a number of ones per column (i.e. in which, to illustrate, the ones are distributed to fewer columns than in the case of a permutation matrix).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip, comprising:
   a plurality of processing circuits, each processing circuit being configured to process a data vector by outputting a multiplication of the data vector by one of a plurality of processing matrices, wherein a sum of the respective processing matrices corresponds to a non-identity-matrix part of a generator matrix of a predetermined linear code in reduced form;

a summing circuit configured to sum the output of the data vector processing generated by the processing circuits;

a storage circuit configured to store the data vector with the summed output of the data vector processing as a data word in a memory;

a read-out circuit configured to read the stored data word out of the memory, and a decoding circuit configured to check whether the read-out data word is a valid code word of the linear code and to output an error signal if the read-out data word is not a valid code word of the linear code and a monitoring circuit, configured to receive the error signal, and to trigger an execution or a deactivation of a program in response to the error signal.

2. The chip of claim 1, further comprising:

a plurality of arithmetic logic units (ALUs), each ALU being configured to generate the data vector from an input vector.

3. The chip of claim 2, each processing circuit being connected to the output of a respective ALU and the ALU being configured to supply the data vector to the processing circuit.

4. The chip of claim 3, the memory being connected to the output of one of the ALUs which is configured to supply the data vector to the memory.

5. The chip of claim 1, the data vector representing a command for a processing element of the chip.

6. The chip of claim 5, the processing element being an arithmetic logic unit (ALU) of the chip.

7. The chip of claim 1, each processing matrix having a one per row and otherwise zeros and one or more ones per row and otherwise zeros.

8. The chip of claim 1, the processing matrices being permutation matrices and each processing circuit being a permutation circuit which is configured to permute the data vector in accordance with a permutation matrix.

9. The chip of claim 1, the processing matrices being at least partially different.

10. The chip of claim 1, the non-identity-matrix part being a vector of matrices which can be represented in each case as a sum of processing matrices.

11. The chip of claim 10, each matrix of the matrices being based on a circular matrix.

12. The chip of claim 10, the matrices being matrices determined on the basis of at least one predetermined characteristic of the linear code.

13. The chip of claim 12, the at least one predetermined characteristic being the Hamming distance of the linear code.

14. The chip of claim 1, wherein the decoding circuit is further configured to determine, for a part of the read-out data word corresponding to the data vector, a redundant part of the summed results of the data vector processing and to check whether the redundant part corresponds to the sum generated by the summing circuit.

15. The chip of claim 1, wherein each of the plurality of processing circuits multiplies the data vector by exactly one processing matrix, and wherein each processing matrix is unique.

16. The chip of claim 1, wherein each of the plurality of processing circuits is configured to multiply the data vector by a plurality of processing matrices, wherein the sum of the processing matrices corresponds to the non-unit-matrix part of a generator matrix of a predetermined linear code in reduced form.

17. A chip card comprising a chip, the chip comprising:

a plurality of processing circuits, each processing circuit being configured to process a data vector by outputting a multiplication of the data vector by one of a plurality of processing matrices, wherein a sum of the respective processing matrices corresponds to a non-identity-matrix part of a generator matrix of a predetermined linear code in reduced form;

a summing circuit configured to sum the output of the data vector processing generated by the processing circuits;

a storage circuit configured to store the data vector with the summed output of the data vector processing as a data word in a memory;

a read-out circuit configured to read the stored data word out of the memory, and a decoding circuit configured to check whether the read-out data word is a valid code word of the linear code and to output an error signal if the read-out data word is not a valid code word of the linear code, wherein each processing matrix generates by multiplication a new vector from the data vector by selecting for each component of the new vector one or more components of the data vector, each component being selected exactly once.

18. The chip card of claim 17, wherein the processing matrices are permutation matrices.

19. A method for detecting a change of a stored data vector comprising:

processing a data vector by outputting a multiplication of the data vector by one of a plurality of processing matrices, a sum of the processing matrices corresponding to a non-identity-matrix part of a generator matrix of a predetermined linear code in reduced form;

summing the generated output of the processing operations of the data vector;

storing the data vector with the summed output of the processing operations as a data word in a memory;

reading the stored data word out of the memory, and checking whether the read-out data word is a valid code word of the linear code and outputting an error signal if the read-out data word is not a valid code word of the linear code.

* * * * *